United States Patent
Tapia et al.

(10) Patent No.: US 11,421,987 B2
(45) Date of Patent: Aug. 23, 2022

(54) LAP JOINT FILLET SEAL MEASUREMENT TOOL WHEN LAP EDGES ARE SEALED

(71) Applicant: The Boeing Company, Chicago, IL (US)

(72) Inventors: William J. Tapia, Chicago, IL (US); Gary E. Georgeson, Chicago, IL (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 16/734,877

(22) Filed: Jan. 6, 2020

(65) Prior Publication Data

US 2021/0207958 A1    Jul. 8, 2021

(51) Int. Cl.
*G01B 21/20* (2006.01)
*G01B 17/06* (2006.01)
*G01B 3/20* (2006.01)
*G01B 7/28* (2006.01)
*G01B 11/24* (2006.01)

(52) U.S. Cl.
CPC ............. *G01B 21/20* (2013.01); *G01B 3/205* (2013.01); *G01B 7/28* (2013.01); *G01B 11/24* (2013.01); *G01B 17/06* (2013.01)

(58) Field of Classification Search
CPC .......... G01B 21/20; G01B 7/28; G01B 11/24; G01B 17/06
USPC ..................................................... 33/503, 613
See application file for complete search history.

(56) References Cited

U.S. PATENT DOCUMENTS

| | | | |
|---|---|---|---|
| 7,287,902 B2 * | 10/2007 | Satai ...................... | G01N 25/72 374/57 |
| 9,945,735 B2 * | 4/2018 | Georgeson ............. | G01N 21/71 |
| 10,209,223 B2 | 2/2019 | Kollgaard et al. | |
| 2019/0113335 A1 * | 4/2019 | Satoyoshi .......... | G01B 11/2441 |
| 2021/0304398 A1 * | 9/2021 | Satai ..................... | G02B 5/3058 |
| 2021/0402557 A1 * | 12/2021 | Zuniga .................. | B24B 37/042 |

* cited by examiner

*Primary Examiner* — George B Bennett
(74) *Attorney, Agent, or Firm* — Quinn IP Law

(57) ABSTRACT

A tool for detecting a covered edge of a structural member through sealant material of a fillet seal includes an edge detection probe mounted to a fixture. The probe outputs an interrogation signal toward the covered edge and receives a return signal indicative of a location of the covered edge. The tool includes an electronic control unit ("ECU") in communication with the edge detection probe and a display screen. The ECU is configured to generate, from the return signal, one or more XY coordinates indicative of the edge location, and to display the edge location on the display screen. Additionally, the tool includes a seal measurement device. In response to the edge location, the device measures a predetermined dimension of the fillet seal, including a thickness and/or a shape of the fillet seal. A method includes detecting the covered edge using the tool.

20 Claims, 4 Drawing Sheets

LAP JOINT FILLET SEAL MEASUREMENT TOOL WHEN LAP EDGES ARE SEALED

BACKGROUND

Panels, plates, flanges, fasteners, and other structural members are used in the construction of a wide range of manufactured structural assemblies. For instance, longerons and struts of an aircraft fuselage are securely fastened together to form a core structure suitable for supporting the aircraft's fuselage skin, wings, empennage, and other loads. Consumer products, infrastructure, and other types of vehicles are likewise constructed of interconnected structural members, some of which may overlap or abut one another to form a respective lap joint or butt joint.

Lap and butt joints are commonly sealed against the elements using a weatherproof sealant material. Fillet seals in particular are often formed along right-angle corners of interfacing or adjacent surfaces of such structural members. In addition to preventing ingress of moisture and debris between the structural members, a fillet seal may also permit an application-suitable amount of relative joint movement, or the seal may be used to reduce aerodynamic drag in certain applications. As will be appreciated by those of ordinary skill in the art, formation of a well-constructed fillet seal generally entails the application of a continuous bead of sealant material at an angle of approximately 45° to the adjacent surfaces forming the above-noted right-angle corner. The face of the fillet seal may be flat, convex, or concave depending on the manner in which the sealant was applied and the desired sealing qualities.

In certain applications, such as when one of the interfacing structural members is relatively thin or when a fastener head protrudes above a surface of a panel or a plate, the sealant material used to form the fillet seal may entirely cover a joint edge of the interfacing structural components. A problem thus presents itself in that the precise location of the covered edge, being obscured or hidden behind the sealant material, is unavailable as a reference point when measuring and validating the fillet seal's various dimensions. A need therefore exists for an improved method and associated hardware for measuring seal characteristics of a fillet seal that covers a corner joint edge in an aircraft or other manufactured structural assembly.

SUMMARY

The present disclosure pertains to a tool and accompanying method for locating a covered edge of adjacent structural members, e.g., sheet metal or composite panels, fasteners, or flanges. The term "covered edge" as used herein refers to an edge surface of a first one of the adjacent structural surfaces, the plane of which intersects a second one of the structural members, that is covered with sealant material of a fillet seal. As noted above, fillet seals are typically used to seal right-angle corners of overlapping or abutting structural members, with resulting joints defined by the interfacing structural members generally referred to as lap joints and buttjoints, respectively. Additionally, installed fasteners may have exposed fastener heads. Such fastener heads may be covered by sealant material to protect against ingress of moisture around the fastener's shaft. Other interfacing structural members may be contemplated within the scope of the disclosure, with reference made herein to sheet metal panels and fasteners for illustrative consistency without limiting the disclosure to such a configuration.

As will be appreciated by those of ordinary skill in the art, various government, industry, and corporate standards regulate the critical dimensions of a fillet seal. To that end, manual touch gauges such as the commercially-available Automatic Weld Size ("AWS") Gauge from G.A.L. Gauge Company of Bridgman, Mich., are frequently used to measure the width, height, and depth of a fillet seal, as well as the fillet seal's convexity or concavity. Such measurements rely on access to the edge of an uppermost one of the structural members, with the edge forming a fixed reference point or reference line/plane from which all remaining dimensions may be measured or calculated. However, the edge is sometimes hidden behind the fillet seal material as noted above. This is particularly true when working with thin sheet metal components or when the sealant material fully encapsulates or covers a fastener head. The present approach is therefore intended to locate the covered edge and facilitate subsequent measurements and analysis of the fillet seal.

In an exemplary embodiment, the disclosed tool includes an edge detection probe that is securely mounted to a fixture. The tool also includes an electronic control unit ("ECU"), a display screen, and a seal measurement device, with the ECU in communication with the display screen and, in some embodiments, with the seal measurement device. The probe is configured to output an interrogation signal as a waveform, which propagates through the material of the fillet seal falls incident upon a covered edge of adjacent structural members. The probe thereafter receives a return signal indicative of a location of the covered edge.

The ECU is configured to translate the return signal into one or more XY coordinates on an XY impedance plane, with the XY coordinates indicative of the edge location. The ECU also displays the XY coordinate(s) on the display screen. In response to the edge location, the seal measurement device measures one or more predetermined dimensions of the fillet seal, including a thickness and/or shape of the fillet seal. Such measurements may be used to validate the fillet seal, e.g., when making a pass/fail or go/no-go binary determination or a more complex evaluation of the fillet seal's profile.

The interrogation signal from the edge detection probe may be an electromagnetic signal in some embodiments or an acoustic signal in other embodiments. The choice of waveform energy used in implementing the tool may vary with the intended application, e.g., based on the electrical conductivity of the structural members and seal material.

The edge detection probe is configured as an eddy current probe in an exemplary embodiment. The interrogation signal in such an embodiment is an electromagnetic wave generated with respect to the probe, and an eddy current that is generated on a surface of an uppermost one of the structural members as a result of incident energy from the electromagnetic wave.

The seal measurement device in a simplified configuration may be a touch gauge, e.g., a digital micrometer, a ruler, or the above-noted AWS Gauge. The seal measurement device may be alternatively embodied as a laser line scanner configured to generate a full profile of the fillet seal as the predetermined dimension, or as a laser distance meter configured to measure the predetermined dimension as a linear distance between the laser distance meter and a surface of the fillet seal.

The uppermost structural member in certain embodiments is less than 0.25 inches thick. The structural members may be electrically-conductive sheet metal panels, with the covered edge being adjacent to a lap joint formed by the conductive sheet metal panels.

In a particular configuration of the disclosed tool, the fixture is a T-shaped assembly constructed of a cantilevered beam arranged orthogonally with respect to a main beam. The edge detection probe in such an embodiment is mounted to the cantilevered beam, with translation of the fixture toward the covered edge occurring along a surface of one of the structural members.

The ECU may be optionally programmed with a calibrated alarm box having a perimeter defined by predetermined X and Y coordinate limits. The ECU in such an embodiment may activate an audio and/or visual alarm, with the ECU possibly recording or transmitting a diagnostic code in response to a relative position of the XY coordinate of the covered edge with respect to the alarm box perimeter.

A method for detecting the covered edge of the structural member through sealant material of a fillet seal is also disclosed. The method in an embodiment includes translating the fixture and the edge detection probe mounted thereto toward the covered edge, and outputting an interrogation signal toward the covered edge via the edge detection probe. The method also includes receiving a return signal indicative of a location of the covered edge, and generating, from the return signal via an electronic control unit ("ECU"), one or more XY coordinates indicative of the edge location. The method may include displaying the edge location on the display screen. in response to the edge location, the method may also include using a seal measurement device to measure a predetermined dimension of the fillet seal, including a thickness and/or a shape of the fillet seal.

In another embodiment, a tool for detecting a covered edge of a structural member through sealant material of a fillet seal includes a fixture constructed of a main beam and a cantilevered beam arranged orthogonally with respect to the main beam, and an eddy current probe mounted to the cantilevered beam of the fixture. The eddy current probe is configured to output an electromagnetic interrogation signal toward the covered edge, and to receive a return signal indicative of a location of the covered edge.

The tool in this exemplary embodiment also includes a display screen, an ECU communication with the edge detection probe and the display screen, configured to translate the return signal into one or more XY coordinates indicative of the edge location, and to display the edge location on the display screen, and a seal measurement device in the form of a laser line scanner configured to generate a full profile of the fillet seal as the predetermined dimension or a laser distance meter configured to measure the predetermined dimension as a linear distance between the laser distance meter and a surface of the fillet seal. The ECU in this embodiment is configured with a calibrated alarm box having a perimeter defined by predetermined X-axis and Y-axis limits, and to activate an alarm and/or record a diagnostic code in response to a relative position of the one or more XY coordinates with respect to the perimeter of the alarm box.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

Figure 1:
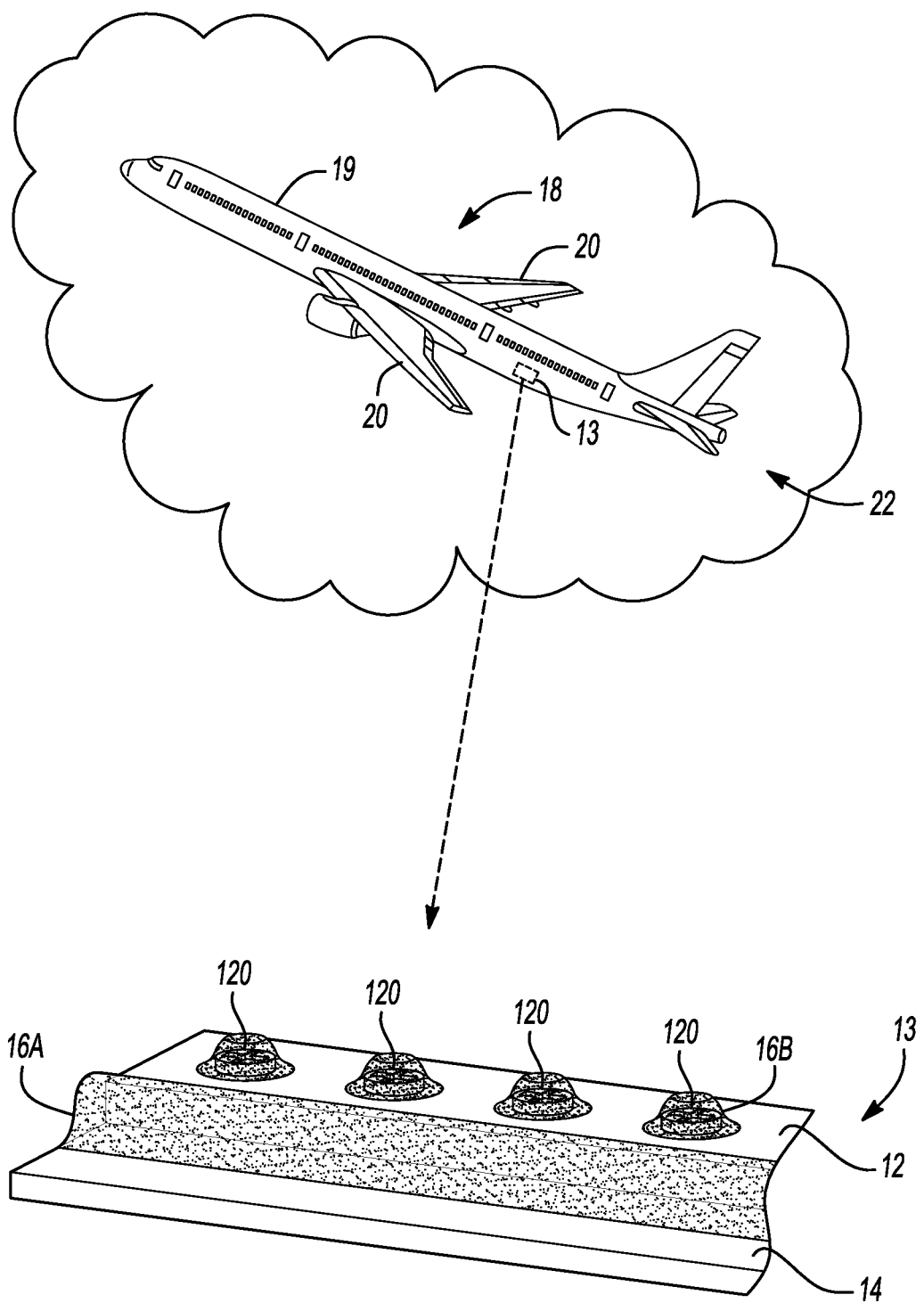
FIG. 1 is a schematic illustration of a representative set of structural members having an edge covered with seal material of a fillet seal, such that the edge is obscured or hidden behind the fillet seal.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 3:
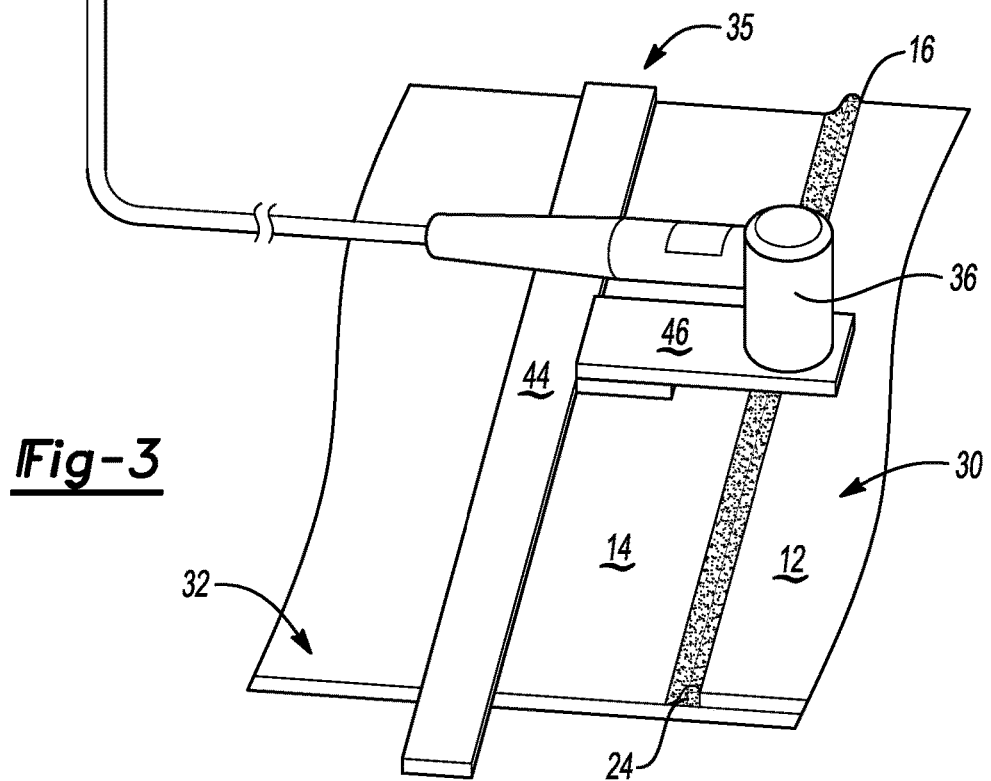
FIG. 3 is a schematic illustration of a tool configured for locating a covered edge of adjacent structural members.
Figure 4:
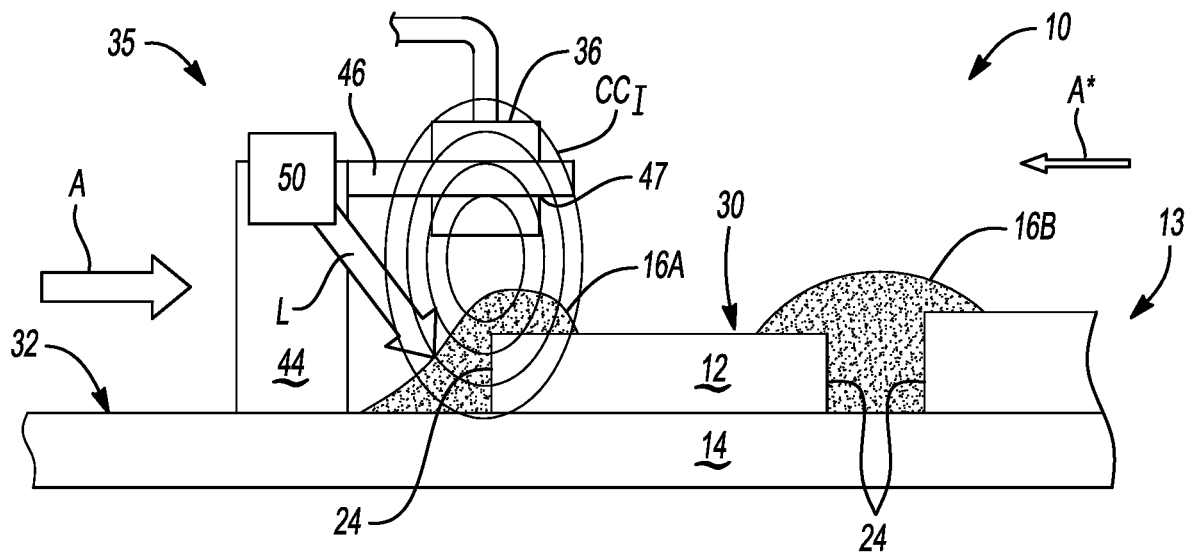
FIG. 4 is a schematic cross-sectional illustration of the tool shown in FIG. 3.
Figure 5:
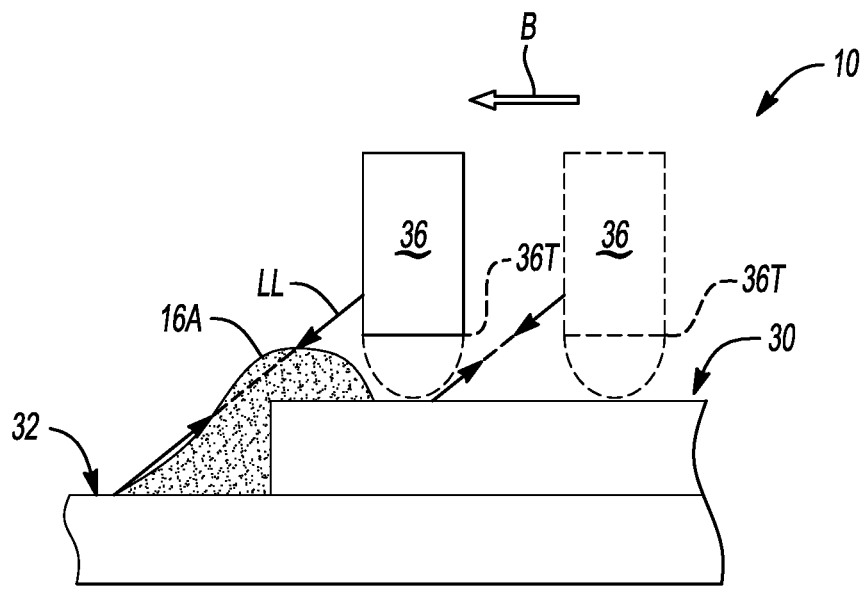
FIG. 5 is a schematic cross-sectional illustration of an alternative embodiment of the tool shown in FIG. 4.

Referring to the drawings, wherein like reference numbers refer to like features throughout the several views, a fillet seal dimensional measurement tool is described herein with reference to the several Figures, with exemplary embodiments depicted as a representative tool 10 in FIGS. 3-5. The disclosed tool 10 is configured and used for determining the precise location of a covered edge of adjacent structural members 13. As illustrated in FIG. 1, such structural members 13 may be first and second panels 12 and 14 in some embodiments, with the first and second panels 12 and 14. In other embodiments, the structural members 13 may be a fastener 120 and the first panel 12.

A joint defined between the structural members 13 may be a lap joint or a butt joint as noted above, or any other joint in which an edge of one of the structural members 13 is entirely covered by sealant material of a fillet seal 16A and/or 16B. Such a covered edge is not accessible for direct measurement in the usual manner, given the interposed sealant material blocking access to the covered edge. As the location of the covered edge is required as a reference point, line, or plane in subsequently determining critical dimensions of the fillet seals 16A or 16B, it is difficult to determine if the fillet seal conforms to relevant standards. The present tool 10 is intended to address this particular problem by enabling accurate measurement of the fillet seals 16A and/or 16B, with various embodiments described herein being usable across a wide range of applications and industries.

The exemplary structural members 13 may be used in some embodiments in the construction of an aircraft 18, as shown in an inset in FIG. 1. The exemplary aircraft 18 includes a fuselage 19, wings 20, and an empennage assembly 22, any or all of which may include the structural members 13. Other locations aboard the aircraft 18 may use such structural members 13, e.g., landing gear assemblies, cargo bays, engine assemblies, or within a cabin or cockpit of the aircraft 18. Likewise, the structural members 13 may be used in other types of vehicles, consumer products, or infrastructure such as buildings or bridges, with the aircraft 18 being just one possible application benefitting from use of the fillet seals 16A and/or 16B.

Figure 2:
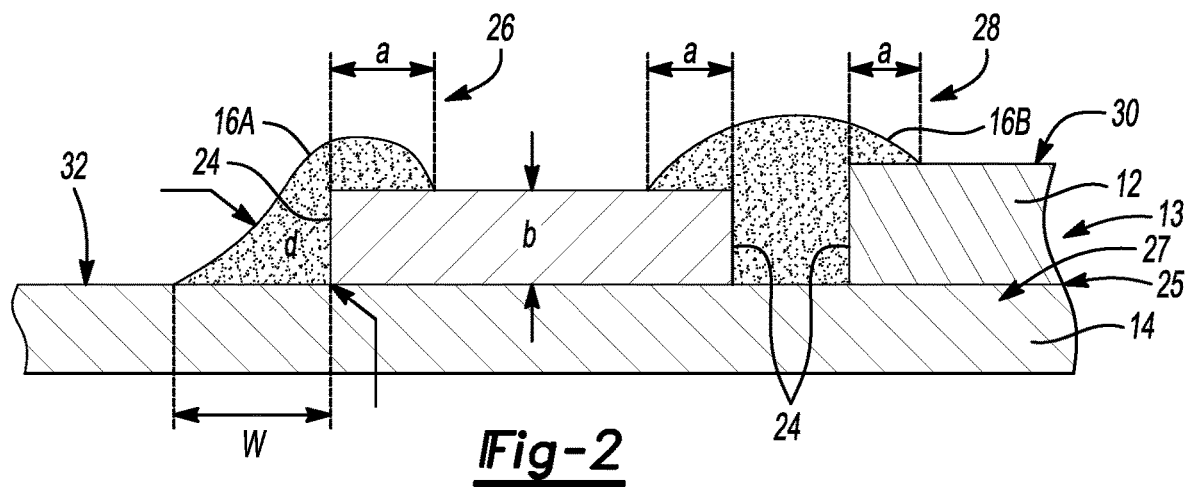
FIG. 2 is a schematic cross-sectional illustration of exemplary fillet seals having characteristics that are measured and analyzed using the disclosed tool and associated methodology.

Referring to FIG. 2, two exemplary joints are depicted in FIG. 2, i.e., a lap joint 26 and a butt joint 28. The lap joint 26 and butt joint 28 may be sealed with an application-suitable sealant material to form the respective fillet seals 16A and 16B. In an aerospace manufacturing process, for instance, the sealant material may be a class A or class B sealant of the type customarily used in the art, such as a two-part polysulfide. Other industries may employ other application-suitable sealant materials, e.g., silicone, polyurethane, or butyl rubber. That is, the particular composition of the sealant material may vary with the intended application, the amount of flexibility, resistance to exposure to certain chemicals, and other possible factors, with the present teachings not being limited to any particular sealant material. The sealant material employed in constructing the fillet seals 16A and 16B may be opaque, translucent, or transparent, and may be electrically conductive or non-conductive.

The structural members 13 of FIG. 2 may include the first and second panels 12 and 14, with the first and second panels 12 and 14 having a respective upper surface 30 and 32 when in the illustrated overlapping orientation. A lower surface 27 of the first panel 12 defines a joint interface 25 in conjunction with the upper surface 32 of the second panel 14. An edge 24 of the first panel 12 may be arranged along a plane that intersects the joint interface 25, e.g., at an orthogonal angle as shown.

In certain circumstances, such as when the first panel 12 is relatively thin, e.g., 0.25" or less, or when the fastener 120 of FIG. 1 has an exposed fastener head, the fillet seal 16A or 16B crowns over the upper surface 30 of the first panel 12. Such a crowning construction of the fillet seals 16A or 16B may be used to provide added sealing integrity or other benefits such as protection from electrical discharge. Under such conditions, the sealant material used to form the fillet seal 16A or 16B may completely cover the edge 24 of the first panel 12, thereby rendering edge 24 inaccessible as a fixed reference point in measuring characteristics of the fillet seal 16A or 16B. For clarity, the edge 24 is referred to hereinafter as covered edge 24.

As a result of the presence of the covered edge 24, relevant dimensions of the fillet seal, shown as dimensions (a), (d), and (w) in FIG. 2, are difficult to accurately determine during a subsequent inspection and validation process. For example, when thickness (b) of the first panel 12 is less than 0.25" as noted above, which is a representative dimension common in the aerospace manufacturing industry, the (a) and (w) dimensions may be required to conform to a predetermined range, such as 0.10" to 0.25". The (d) dimension must likewise conform to a particular standard, e.g., 0.08" or more in such an exemplary application. Thus, precise knowledge of the location of the covered edge 24 is essential to performing accurate measurement and validation of the various dimensions of the fillet seals 16A and 16B.

A simple touch gauge is typically used during the inspection of a fillet seal, e.g., fillet seals 16A or 16B of FIG. 2, in order to measure the relevant dimensions thereof. As touch gauges require knowledge of the location of a reference edge for accurate measurements, i.e., the covered edge 24, the use of fillet seals 16A or 16B on thin structural members 13 in particular can complicate the subsequent measurement and inspection of the fillet seals 16A or 16B. The present approach is therefore intended to help solve this potential problem by facilitating accurate measurement and validation at least of the (d) dimension, as well as other dimensions and characteristics of the illustrated fillet seals 16A and 16B.

Referring to FIG. 3, the tool 10 in a representative embodiment includes a fixture 35 and an edge detection probe 36, with the probe 36 securely mounted to the fixture 35. The probe 36 is configured to output an interrogation signal toward the covered edge 24 of the first panel 12 through the fillet seal 16A and/or 16B, which is shown in FIG. 3 as an elongated seal for a lap joint. The probe 36 receives a return signal, changes in which are indicative of the location of the covered edge 24. The tool 10 in this particular embodiment additionally includes a display screen 40 and an electronic control unit ("ECU") 42, with the ECU 42 in communication with the probe 36 and the display screen 40, such as via transfer conductors or wirelessly. As explained in detail below, the ECU 42 is configured to use the return signal to derive an XY coordinate or coordinates indicative of the edge location, and to display the XY coordinate/edge location on the display screen 40.

A seal measurement device ("SMD") 50 is also used as part of the tool 10. The seal measurement device 50 is configured, in response to the detected edge location of covered edge 24 by the edge detection probe 36, to measure a predetermined dimension of the fillet seal 16A and/or 16B, including its thickness and/or shape. When a lap joint or butt joint are being considered, the covered edge 24 defines a corner, typically a right-angle corner or approximately so. However, the covered edge 24 may have a different shape, e.g., circular or curvilinear, and therefore right-angle corners are just one possible application for the present teachings.

Further respect to the fixture 35, this component of the tool 10 is configured to translate toward the covered edge 24 along one of the structural members 13, in this instance along the upper surface 32 of the second panel 14. In a possible embodiment, the fixture 35 may be a T-shaped configuration of a main beam 44 and a cantilevered beam 46. The cantilevered beam 46 is arranged orthogonally with respect to the main beam 44, and may be joined to or integrally formed with the main beam 44. The edge detection probe 36 may be potted or otherwise securely mounted to an upper surface of the cantilevered beam 46. In such an embodiment, the cantilevered beam 46 should be constructed of non-conductive material such as plexiglass or plastic so that the materials of the fixture 35 do not interfere with or degrade the interrogation signal from the probe 36. Alternatively, a bore 47 (see FIG. 4) may be formed in the cantilevered beam 46, with the probe 36 mounted to the cantilevered beam 46 and protruding through such a bore 47.

When an operator or robot translates the fixture 35 along the structural components 13, the edge detection probe 36 approaches the covered edge 24. To that end, the probe 36 is configured to output the interrogation signal ($CC_I$) and receive the return signal to thereby identify and locate the covered edge 24 through the intervening material of the fillet seal 16A or 16B. The return signal detected by the probe 36 is indicative of the location of the covered edge 24, with the edge location thereafter used to inform or control measurements by the seal measurement device 50 as set forth below.

In an exemplary embodiment, the edge detection probe 36 may be configured as an eddy current probe. As will be appreciated, the principle of operation of an eddy current probe is that of electromagnetic induction. A typical eddy current probe includes an excitation coil constructed of copper or another suitable electrical conductor, and a similarly constructed feedback coil. The excitation coil is connected to and energized by a polyphase/AC power supply, e.g., 110-120 VAC/50-60 Hz. The polyphase current in the excitation coil at a predetermined frequency generates a time-varying magnetic field around the coil. The probe 36 is placed near the first panel 12 of the adjacent structural members 13, with the first panel 12 in this embodiment of the probe 36 being constructed of an electrically conductive material, e.g., steel or aluminum sheet metal. As a result, eddy currents are induced on the upper surface 32 of the first panel 12.

Edge detection using an eddy current probe embodiment of probe 36 thus involves using a time-varying magnetic field resulting in eddy currents as the above-noted interrogation signal, represented collectively as $CC_I$ in FIG. 4. The covered edge 24 at a distal end of the upper surface 30 disturbs circulation of the generated eddy currents, with a resulting change in magnetic coupling with the probe 36. Phase and amplitude changes together form a change of signal resulting from disruption of the eddy currents, with this change of signal detected by the probe 36 as the return signal. The received return or return signal identifies and locates the covered edge 24 through the intervening thickness of the seal material of fillet seal 16A or 16B, as explained above, and thus is indicative of the edge location. The seal measurement device 50 may thereafter be used to generate a measurement signal (arrow L), e.g., a laser beam, in order to measure characteristic dimensions of the fillet seals 16A and/or 16B.

A key to successful edge detection in this particular embodiment is maintenance of good coupling of the generated magnetic field from the probe 36 with the upper surface 30 and the covered edge 24. In the case where fasteners 120 of FIG. 1 installed in the first panel 12 may interfere with the magnetic field, the probe 36 can be translated over the upper surface 32 of the second panel 14, and thus away from the undesirable effects of such fasteners 120.

Alternative embodiments of the edge detection probe 36 may be envisioned that operate in different portions of the electromagnetic spectrum. Exemplary frequencies usable as part of the present tool 10 include millimeter wave energy, e.g., 30-300 GHz, as well as energy in the terahertz, microwave, and infrared ranges of frequencies. Each defined frequency range has unique spectral properties, as will be appreciated by those of ordinary skill in the art, with some frequencies possibly reflecting at higher rates when falling incident on certain types of materials. Therefore, the operating wavelengths or frequencies of probe 36 are selected based on the particular properties of the structural members 13 as well as the sealant material used to form the fillet seals 16A and/or 16B.

Referring briefly to FIG. 5, it is also possible in some embodiments for the tool 10 to utilize the process of acoustic coupling, e.g., piezoelectric transducers, to transmit the interrogation signal $CC_I$ at ultrasonic frequencies. Such an embodiment may translate the edge detection probe 36 in the direction of arrow B from an initial position (1) toward a measurement position (2), with a tip 36T of the probe 36 in contact with the upper surface 30 and position (2) being adjacent to the covered edge 24. The change in the acoustic signal may be detected by the probe 36 as the return signal in such an embodiment, with the change of signal being indicative of the location of the covered edge 24. An acoustic embodiment of the probe 36 may be advantageous in certain constructions of the structural members 13, such as when the structural members 13 are constructed of non-conductive or dielectric materials.

In another possible configuration, a plane wave (arrows LL) may be transmitted from the probe 36 toward the upper surface 30, such that incident energy reflects directly back toward the probe 36 for detection. The plane wave used as the interrogation signal $CC_I$ reflects off of the upper surface 30 of the first panel 12 until the covered edge 24 is encountered, at which point the plane wave 32 reflects off of the upper surface 32 of the second panel 14, with this change detected by the probe 36 as being indicative of the edge location. When the sealant material used to construct the fillet seal 16A and/or 16B is transparent, it may also be possible to utilize a probe 36 having an electrooptical sensor, e.g., with a red-green-blue ("RGB") laser and vision software configured to recognize a pattern indicative of the covered edge 24 through the intervening transparent seal material.

Once the covered edge 24 is located through the sealant material using one of the various embodiments of the edge detection probe 36 described above, measurement of the (d) dimension of FIG. 4 and/or another dimension, profile, or other characteristic of the fillet seal 16A and/or 16B may be made using the seal measurement device 50 of FIG. 4. The various non-contact embodiments of the seal measurement device 50 may be securely mounted on the fixture 35. In certain automated environments, the probe 36 may automatically prompt the device 50 to initiate measurement of dimensions or other characteristics of the fillet seal 16A and/or 16B. In other embodiments, such prompting may include requesting the ECU 42 of FIG. 3 to display a message on the display screen 40 requesting touch or remote measurement of the characteristics.

For example, in a simplified embodiment the seal measurement device 50 may be a touch gauge in the form of a fillet welding inspection tool, e.g., the above-noted AWS gauge. As will be appreciated, such devices are configured to measure characteristics such as fillet leg length, concavity, and convexity, with the touch gauge physically contacting the workpiece and a surface of the fillet seal. Alternatively, a touch gauge in the form of a digital micrometer may be used to read out the (d) dimension or other desired dimensions at a selected angle or distance from the covered edge 24. The seal measurement device 50 may also be embodied as a ruler or slide set to the required thickness. In each case, precise foreknowledge of the edge location determined via the edge detection probe 36 informs subsequent measurements taken by the seal measurement device 50, and thus allows the seal characteristics, e.g., a thickness such as the (d) dimension and/or a shape of the 16A and/or 16B, to be validated against relevant inspection standards or thresholds.

Automated non-contact approaches also exist for implementing the seal measurement device 50. For example, the device 50 may be embodied as a laser line scanner configured to measure multiple dimensions of the fillet seal 16A and/or 16B, and thus able to generate a full surface profile of the fillet seal. Such a laser line scanner may be a profilometer configured to compute the relevant sealant characteristics from such measured surface topography, e.g., an optical profilometer. The device 50 may also be embodied as a laser distance meter configured to measure the 16A and/or 16B at a predetermined angle or linear distance from the fillet seal.

Figure 6:
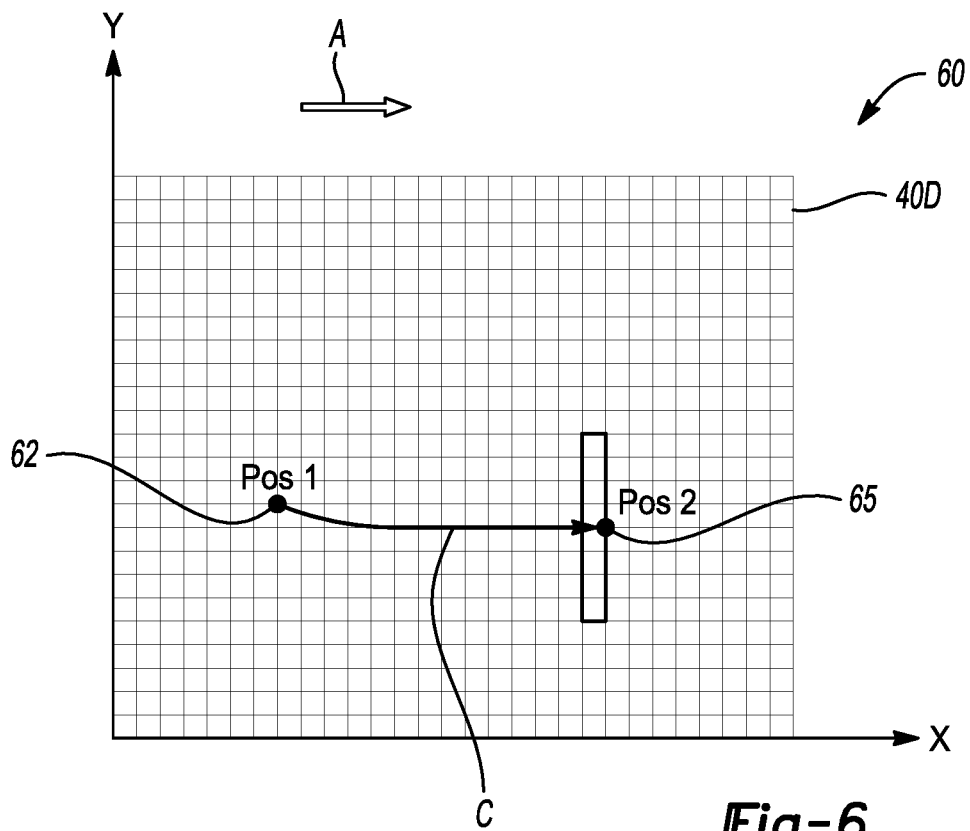
FIGS. 6 and 7 are schematic illustrations of different display screen presentations generated using the tool shown in FIGS. 3-5.

Referring to FIG. 6, an embodiment of the display screen 40 presents an XY impedance plane as a grid 60. A flying dot 62 corresponding to the center of probe 36 has corresponding XY coordinates on the grid 60. As the fixture 35 and the connected probe 36 are translated toward the covered edge 24, e.g., in the direction of arrow A in FIG. 4, the flying dot 62 moves from a first position ("Pos 1") to a second position ("Pos 2"), as represented by vector C. Here, vector C is an illustration of the movement of the flying dot 62 as the magnetic field from the probe 36 begins to interact with the covered edge 24. As will be appreciated, with a standard eddy current impedance plane-based instrument, vector C can be manipulated by changing the vertical and horizontal gain settings.

In the second position in FIG. 6, the center of probe 36 can be exactly over a corner of the covered edge 24, in this instance the lap joint 16A of FIG. 4. In theory, the edge 24 can be measured from any position, provided the magnetic field has sufficient density to interact with the covered edge 24. An optional calibrated alarm box 65 may be optionally programmed into the ECU 42, with the programmed perimeter of the alarm box 65 used to alert an operator as to close proximity of the probe 36 to the covered edge 24.

Figure 7:
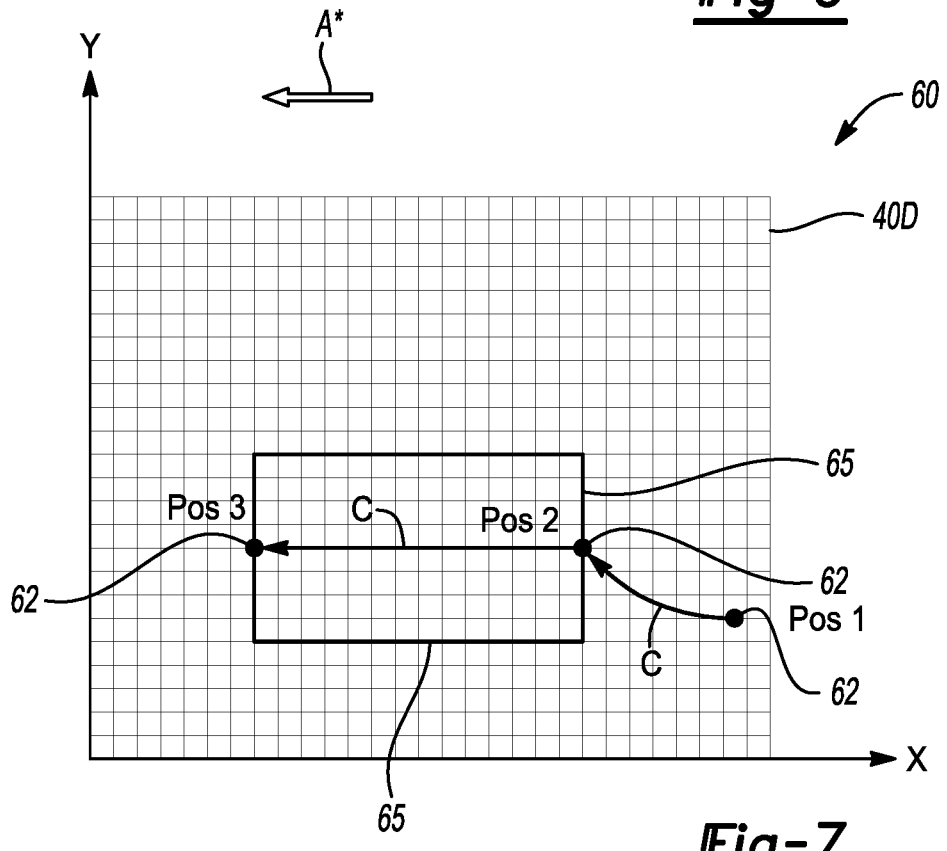

FIG. 7 depicts detection of two different covered edges 24, e.g., when detecting and measuring the covered edges 24 of the exemplary fillet seal 16B of FIG. 4. In such an embodiment, the center of probe 36, indicated by flying dot 62, may approach the fillet seal 16B from a first position (Pos1) from the right as indicated by arrow A*. In such an approach, the center of the first encountered edge 24 would be detected as a "drop off" from the upper surface 30, i.e., second position (Pos2). The subsequently detected covered edge 24, i.e., a rising edge, would be detected at a third position (Pos3) in a manner similar to detection of the covered edge 24 of the fillet seal 16A. The depicted trajectories of the vectors C is intended to be illustrative of the present teachings and not limiting, with different trajectories and alarm boxes 65 being possible in other embodiments.

In terms of real-time feedback, the ECU 42 of FIG. 3 in communication with the edge detection probe 36 and the display screen 40 may be configured to translate the return signal from the probe 36 into XY coordinates on the XY impedance plane, with the XY coordinates being indicative of the covered edge location. The ECU 42 may display the XY coordinates on the display screen 40 along with the optional alarm box 65. In a possible embodiment, the alarm box 65 may define a predetermined allowable range, e.g., 0.10" to 0.25". When the perimeter of the alarm box 65 is crossed by flying dot 62, a binary transistor-transistor logic ("TTL") signal may be activated, which in turn can be used to command the measurement device 50 of FIGS. 3 and 4 to measure the fillet seal 16A and/or 16B. Measurement in various embodiments may be a simple pass/fail or "go/no-go" measurement, a single dimension such as the (d) dimension, multiple dimensions, or generation of a full surface profile or 3D profile of the fillet seal 16A and/or 16B.

As will be appreciated by those of ordinary skill in the art in view of the foregoing disclosure, a method is also enabled for detecting the covered edge 24 of one of the structural members 13 through sealant material of the fillet seal 16A and/or 16B. Such a method may include translating the fixture 35 and the edge detection probe 36 mounted thereto toward the covered edge 24, and outputting the interrogation signal $CC_I$ toward the covered edge 24 via the edge detection probe 36. The method may also include receiving a return signal $CC_R$ indicative of the location of the covered edge 24 and converting the return signal, $CC_R$, via the ECU 42, into one or more XY coordinates indicative of the edge location. Some embodiments of the method may include displaying the edge location on the display screen 40. In response to the edge location, the method may also include using the seal measurement device 50 to measure a predetermined dimension of the fillet seal 16A and/or 16B, including a thickness and/or a shape thereof.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A tool for detecting a covered edge of a structural member through sealant material of a fillet seal, the tool comprising:
   a fixture;
   an edge detection probe mounted to the fixture, wherein the edge detection probe is configured to output an interrogation signal toward the covered edge, and to receive a return signal indicative of a location of the covered edge;
   a display screen;
   an electronic control unit ("ECU") in communication with the edge detection probe and the display screen, wherein the ECU is configured to translate the return signal into one or more XY coordinates indicative of the edge location, and to display the edge location on the display screen; and
   a seal measurement device configured, in response to the return signal indicative of the edge location, to measure a predetermined dimension of the fillet seal, including a thickness and/or a shape of the fillet seal.

2. The tool of claim 1, wherein the interrogation signal is the electromagnetic signal and the edge detection probe is an eddy current probe.

3. The tool of claim 1, wherein the interrogation signal is an acoustic signal and the edge detection probe is an ultrasonic transducer.

4. The tool of claim 1, wherein the interrogation signal is a plane wave, and the return signal is a reflected portion of the plane wave.

5. The tool of claim 1, wherein the seal measurement device is a touch gauge.

6. The tool of claim 5, wherein the touch gauge is a digital micrometer.

7. The tool of claim 1, wherein the seal measurement device is a laser line scanner configured to generate a full profile of the fillet seal as the predetermined dimension.

8. The tool of claim 1, wherein the seal measurement device is a laser distance meter configured to measure the predetermined dimension as a linear distance between the laser distance meter and a surface of the fillet seal.

9. The tool of claim 1, wherein the structural member is less than 0.25 inches thick.

10. The tool of claim 1, wherein the structural member is a conductive panel, and the covered edge is an edge of a lap joint formed by conductive panel and another structural member.

11. The tool of claim 1, wherein the fixture is constructed of a main beam and a cantilevered beam arranged orthogonally with respect to the main beam, and wherein the edge detection probe is mounted to the cantilevered beam.

12. The tool of claim 1, wherein the ECU is configured with a calibrated alarm box having a perimeter defined by predetermined X-axis and Y-axis limits, and the ECU is configured to activate an alarm and/or record a diagnostic code in response to a relative position of the one or more XY coordinates with respect to the perimeter of the alarm box.

13. The tool of claim 1, wherein the structural member is a fastener having an exposed faster head, and wherein the fillet seal covers an outer surface of the exposed fastener head.

14. A method for detecting a covered edge of a structural member through sealant material of a fillet seal, the method comprising:
    translating a fixture and an edge detection probe mounted thereto toward the covered edge;
    outputting an interrogation signal toward the covered edge via the edge detection probe;
    receiving a return signal indicative of an edge location of the covered edge;
    translating the return signal, via an electronic control unit ("ECU") into one or more XY coordinates indicative of the edge location;
    displaying the edge location on the display screen; and
    in response to return signal indicative of the edge location, using a seal measurement device to measure a predetermined dimension of the fillet seal, including a thickness and/or a shape of the fillet seal.

15. The method of claim 14, wherein the edge detection probe is an eddy current probe, and the interrogation signal is an electromagnetic signal.

16. The method of claim 14, wherein the edge detection probe is an ultrasonic transducer, and wherein the interrogation signal is an acoustic signal.

17. The method of claim 14, wherein the seal measurement device is a laser line scanner configured to generate a full profile of the fillet seal as the predetermined dimension, or a laser distance meter configured to measure the predetermined dimension as a linear distance between the laser distance meter and a surface of the fillet seal.

18. The method of claim 14, wherein the fixture is constructed of a cantilevered beam arranged orthogonally with respect to a main beam, the edge detection probe is connected to the cantilevered beam, and translating the fixture and the edge detection probe includes positioning the cantilevered beam directly above the covered edge.

19. The method of claim 14, wherein the ECU is configured with a calibrated alarm box having a perimeter defined by predetermined X-axis and Y-axis limits, the method further comprising activating an alarm and/or recording a diagnostic code in response to a relative position of the one or more XY coordinates with respect to the perimeter of the alarm box.

20. A tool for detecting a covered edge of a structural member through sealant material of a fillet seal, the tool comprising:
    a fixture constructed of a main beam and a cantilevered beam arranged orthogonally with respect to the main beam;
    an eddy current probe mounted to the cantilevered beam of the fixture, wherein the eddy current probe is configured to output an electromagnetic interrogation signal toward the covered edge, and to receive a return signal indicative of a location of the covered edge;
    a display screen;
    an electronic control unit ("ECU") in communication with the edge detection probe and the display screen, wherein the ECU is configured to translate the return signal into one or more XY coordinates indicative of the edge location, and to display the edge location on the display screen; and
    a seal measurement device configured, in response to the return signal indicative of the edge location, to measure a predetermined dimension of the fillet seal, including a thickness and/or a shape of the fillet seal, wherein the seal measurement device is a laser line scanner configured to generate a full profile of the fillet seal as the predetermined dimension or a laser distance meter configured to measure the predetermined dimension as a linear distance between the laser distance meter and a surface of the fillet seal;
    wherein the ECU is configured with a calibrated alarm box having a perimeter defined by predetermined X-axis and Y-axis limits, and the ECU is configured to activate an alarm and/or record a diagnostic code in response to a relative position of the one or more XY coordinates with respect to the perimeter of the alarm box.

* * * * *